Dec. 21, 1954     F. GIANNOTTI     2,697,467
VEHICLE WHEEL
Filed April 7, 1952
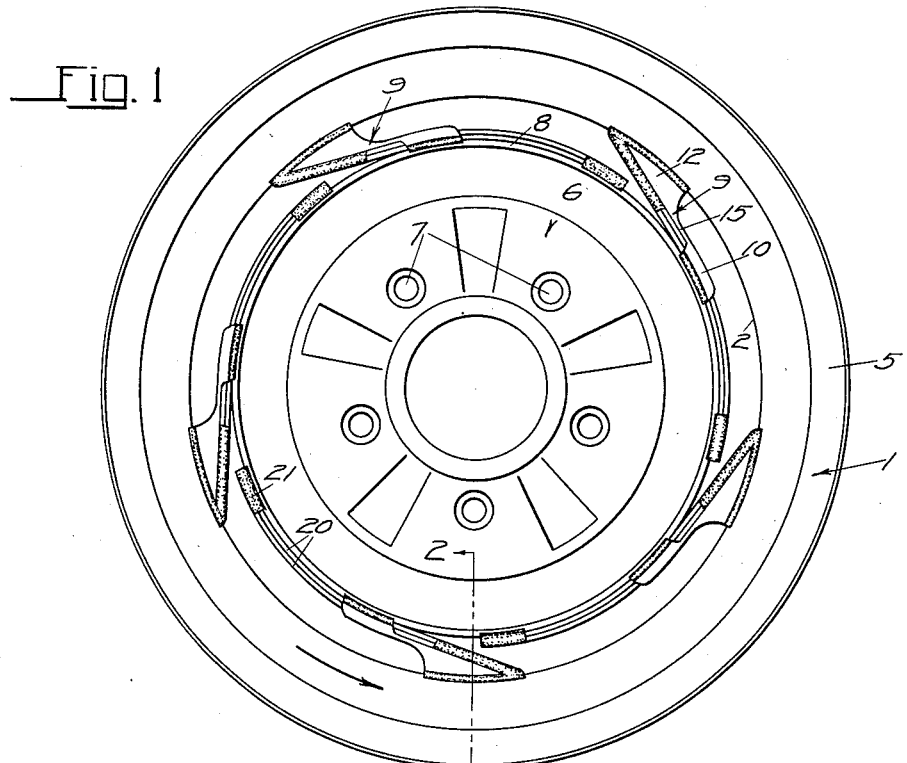
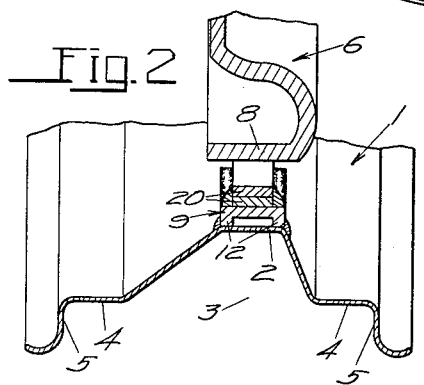
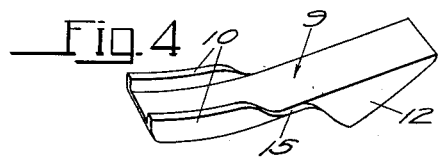
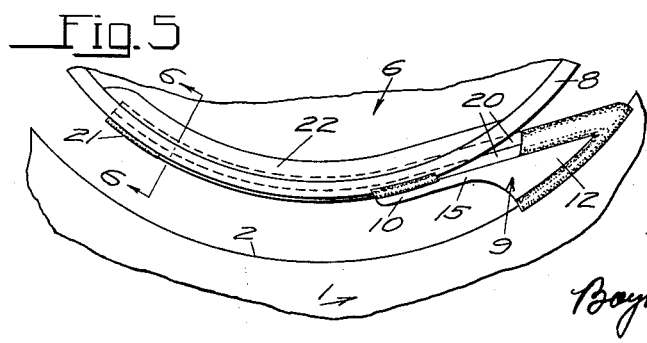
INVENTOR.
FELICE GIANNOTTI
BY
ATTORNEYS

United States Patent Office 2,697,467
Patented Dec. 21, 1954

2,697,467

VEHICLE WHEEL

Felice Giannotti, Menlo Park, Calif.

Application April 7, 1952, Serial No. 280,889

5 Claims. (Cl. 152—75)

This invention relates to a vehicle wheel, such as the wheel of an automobile, airplane or other vehicle, and has for one of its objects the provision of a wheel that is provided with means for absorbing road shocks to a degree where they are noticeably reduced, and in many instances eliminated or reduced to the point where they are not noticeable, and which results are accomplished without increasing the diameter of conventional wheels, and without making the wheel unsafe.

Another object of the invention is the provision of a vehicle wheel which, when supporting a vehicle for movement over the ground, and when the latter is so moving, will have the effect of neutralizing the objectionable effects of unbalance in said wheel (which includes the tire), so that the otherwise noticeable shock and "shimmy" resulting from such unbalanced condition is eliminated, except where the wheel is about a pound and more out of balance, and in such instances the bad effects are greatly reduced.

A still further object of the invention is the provision of a vehicle wheel that improves the driving characteristics of the wheel when the wheel is power driven, and which wheel retains the resistance to distortion of a conventional wheel while providing a yieldable connection between rim and the hub that is adapted to absorb road shocks and that is adapted to neutralize the objectionable effects of an unbalanced wheel, such as wabble and tramp.

Heretofore many efforts have been made to provide for yieldability between the hub of a wheel (which is the portion that is either rotatable on an axle or that is secured thereto) and the rim on which the tire is mounted. Early efforts included the positioning of coil or helical springs between the hub and rim, and others positioned flat springs between the hub and rim, as in U. S. Patent 1,103,512 to Harrington, dated July 14, 1914.

In many instances the springs were concealed by annular discs or plates intended to exclude foreign material, but which had little if any value in stiffening the wheel against distortion when the direction of movement of the vehicle on which the wheels were mounted would be suddenly changed. Such efforts as were made to so stiffen the wheel added objectionable weight to the wheel.

With the present invention the wheel is light in weight yet has the strength required to resist any distortion thereof upon suddenly changing the direction of movement of the vehicle that carries said wheel.

Other objects and advantages will appear in the description and in the drawings.

In the drawings, Fig. 1 is a side elevation of a wheel that is adapted to be mounted on an automobile, the pneumatic tire being left off for clarity.

Fig. 2 is an enlarged sectional view taken along line 2—2 of Fig. 1.

Fig. 3 is a perspective view of one set of springs in one of the units that connects the rim with the hub.

Fig. 4 is a perspective view of one of the elements of the means that connects the rim with the hub.

Fig. 5 is a fragmentary side elevational view of a slightly different form of the invention than is shown in Fig. 1.

Fig. 6 is an enlarged, fragmentary sectional view taken along line 6—6 of Fig. 5.

In detail, the wheel illustrated in the drawings comprises a rim 1 on which a tire is adapted to be mounted. The rim shown in Figs. 1, 2 is a drop-center rim having a bottom wall 2 that forms the bottom of the central well 3 into which the bead portions of the tire are moved to permit the mounting and dismounting of the tire. The bead portions of the tire are on the bead seat 4 when the tire is inflated and tightly against flanges 5.

The hub or central portion generally designated 6, may be formed with the usual bolt holes 7 for securing the wheel to the bearing portion that is on the axle or to the axle, and said hub includes a peripheral, axially directed flange or annular member 8 that is relatively close to the bottom 2 of the rim. Thus an annular space is between the flange 8 of the hub portion and the rim 1.

Rigidly secured to member 8 at equally spaced points therearound are relatively short, flat spring elements 9, one of said elements being shown in Fig. 4 separate from the wheel.

Each of said elements 9 is elongated and one end portion thereof is formed with a pair of opposed flanges 10 along its longitudinally extending edges and projecting to one side of the spring, while opposed flanges 12 are on the other end of the spring element and extend to the other side of said element.

These spring elements including the parts forming the flanges 10, 12 are preferably stamped from sheet spring steel after which the flange parts are bent to form said flanges.

It is to be noted that there is a relatively short section 15 between the pairs of flanges at the ends of each spring element, and it is this section that provides the resiliency since the flanges would substantially prevent any resiliency of the portions of the element between them, although as noted in Fig. 4, said flanges taper to the flat central section 15 so that no sharp line of division is between the flanged ends of each spring element and the section 15 thereof.

The free longitudinally extending edges of the flanges 10 substantially follow the curvature of the member 8 and said free edges are of uniform depth, and said free edges are seated on the radially outer surface of member 8 and said flanges are welded to said member along said free edges. The remainder of each spring element extends substantially tangentially from the member 8 to the rim 1, and the free edges of flanges 12 substantially follow the curvature of the bottom of said rim and said flanges are welded to the rim along said free edges. As seen in Figs. 1 and 4 the flanges 12 are of generally triangular shape in side elevation since the central body of each element 9 does not extend tangential to the rim. This insures a very strong and rigid securement of the elements 9 to the rim.

In the structure as described so far, a spring mounted rim is produced, but in actual usage, there is the likelihood of the rim and hub portion (which includes member 8) being sprung out of coaxial relationship upon the vehicle making a sudden turn at high speed. Also, the spring action produced is not entirely satisfactory.

In order to produce the desired spring action together with the necessary strength to resist any strains that might otherwise distort the wheel, a pair of leaf springs 20 in face to face relation are positioned to extend between the flanges 10 at one of their ends, and to which flanges they are rigidly secured. These springs preferably terminate at one of their ends at the rim, and they extend between the flanges 10 to the member 8 for a substantial distance beyond the element 9 and are welded to said member at a point 21 spaced a substantial distance from the element 9.

In some instances a single leaf spring is entirely satisfactory, and in such instances one spring only is used instead of a pair. When such single spring is used it may be of heavier gauge than where a pair of springs is employed.

By the provision of springs 20, there is practically no chance that the rim and hub will never be sprung out of axial alignment nor will there be other distortion. However, in racing cars, it has been found preferable to form member 8 with radially outwardly opening recesses 22 (Figs. 5, 6) in which the projecting ends of the springs 20 may extend. The sides of such recesses are in close relation to the longitudinally extending edges of said projecting ends and make it impossible for the rims to be moved out of alignment under the excessive strains on said rims during racing. It is, of course, obvious that member 8 may be of lighter sheet metal than is indicated in the drawings and recesses 22 may be stamped therein.

In operation, the wheel is always revolved in the direction of the arrow shown in Fig. 1 in which case the power from the driving axle is transmitted to the rim and tire generally tangentially of the member 8.

It has been found that the character of the resiliency provided by the wheel is such that no noticeable tramp or wabble occurs at any speed where the unbalance does not exceed seventeen or eighteen ounces, and the road shocks are eliminated or are so materially reduced as to be unobjectionable. This absorption of the shocks before they reach the axle lengthens the lift of the vehicle and in many instances will prevent breakage through crystallization, hence the structure adds to the safety of the vehicle.

It is to be noted that in the illustration five spring elements are used. The number that are used depends to a great extent on the size of the wheel, however, an uneven number is believed to be preferable to an even number.

It is also considered preferably that the points 21 are about under the adjacent element 9 and the projecting ends of the springs 20 are about equal in length to the portions that extend along each element. The invention as claimed is not intended to be limited to such detailed structural features except where specifically mentioned in the claims.

I claim:

1. A vehicle wheel having an outer annular rim for a tire and a hub portion that includes an outer annular peripheral member coaxial with and radially spaced inwardly from said rim, a plurality of corresponding flat elongated spring elements extending tangentially from said member to said rim and equally spaced around said member, a leaf spring extending along each of said spring elements longitudinally thereof in face to face engaging relation thereto, one end portion of each leaf spring projecting beyond the element engaged thereby and around said member circumferentially thereof to a point spaced a substantial distance from each element, the opposite ends of each element being respectively rigidly secured to said rim and to said member, one end of said leaf spring being secured to said member at said point and the opposite end being rigid with said rim at a point adjacent to the point of securement between said element and said rim, means on each element rigid therewith extending over the opposite longitudinally extending edges of said leaf spring in close relation thereto at the end of said element that is adjacent to said member.

2. A vehicle wheel having an outer annular rim for a tire and a hub portion that includes an outer annular peripheral member coaxial with and radially spaced inwardly from said rim, a plurality of corresponding flat elongated spring elements extending tangentially from said member to said rim and equally spaced around said member, a leaf spring extending along each of said spring elements longitudinally thereof in face to face engaging relation thereto, one end portion of each leaf spring projecting beyond the element engaged thereby and around said member circumferentially thereof to a point spaced a substantial distance from each element, the opposite ends of each element being respectively rigidly secured to said rim and to said member, one end of said leaf spring being secured to said member at said point and the opposite end being rigid with said rim at a point adjacent to the point of securement between said element and said rim, means rigid with said member extending over the opposite longitudinally extending edges of said leaf spring in close relation thereto for a substantial distance.

3. A vehicle wheel having an outer annular rim for a tire and a hub portion that includes an outer annular peripheral member coaxial with and radially spaced inwardly from said rim, a plurality of corresponding flat elongated spring elements extending tangentially from said member to said rim and equally spaced around said member, a leaf spring extending along each of said spring elements longitudinally thereof in face to face engaging relation thereto, one end portion of each leaf spring projecting beyond the element engaged thereby and around said member circumferentially thereof to a point spaced a substantial distance from each element, the opposite ends of each element being respectively rigidly secured to said rim and to said member, one end of said leaf spring being secured to said member at said point and the opposite end being rigid with said rim at a point adjacent to the point of securement between said element and said rim, flanges integral with said element extending over opposite longitudinally extending edges of said leaf spring adjacent to said member.

4. A vehicle wheel having an outer annular rim for a tire and a hub portion that includes an outer annular peripheral member coaxial with and radially spaced inwardly from said rim, a plurality of corresponding flat elongated spring elements extending tangentially from said member to said rim and equally spaced around said member, a leaf spring extending along each of said spring elements longitudinally thereof in face to face engaging relation thereto, one end portion of each leaf spring projecting beyond the element engaged thereby and around said member circumferentially thereof to a point spaced a substantial distance from each element, the opposite ends of each element being respectively rigidly secured to said rim and to said member, one end of said leaf spring being secured to said member at said point and the opposite end being rigid with said rim at a point adjacent to the point of securement between said element and said rim, a radially outwardly opening recess formed in said member for each of said leaf springs in which the projecting end of each leaf spring is positioned with the opposite sides of each recess being substantially in engagement with the opposite longitudinally extending edges of each spring.

5. A vehicle wheel having an outer annular rim for a tire and a hub portion that includes an outer annular peripheral member coaxial and radially spaced inwardly from said rim, a plurality of corresponding elongated spring elements extending tangentially from said member to said rim and equally spaced around said member, a pair of similar elongated leaf springs in face to face engagement with each other and extending longitudinally of each of said elements in engagement therewith, the end of each element at said rim being rigidly secured to the latter and the other end of each element being rigidly secured to said member, each pair of said leaf springs being rigid with said rim at one of their ends and the opposite ends of each pair extending past the adjacent end of the element in engagement therewith and circumferentially of said member to a point spaced a substantial distance from said last mentioned element and rigidly secured to said member at said point, and means rigid with said member extending across opposite longitudinally extending edges of said leaf springs in close relation thereto for a substantial distance.

References Cited in the file of this patent

UNITED STATES PATENTS

| Number | Name | Date |
|---|---|---|
| 868,047 | Whiteley | Oct. 15, 1907 |
| 1,103,512 | Harrington | July 14, 1914 |
| 1,125,864 | Miller | Jan. 19, 1915 |
| 2,628,651 | Gilbert | Feb. 17, 1953 |